(12) United States Patent
Morero et al.

(10) Patent No.: US 10,958,354 B2
(45) Date of Patent: *Mar. 23, 2021

(54) FORWARD AND BACKWARD PROPAGATION METHODS AND STRUCTURES FOR COHERENT OPTICAL RECEIVER

(71) Applicant: INPHI CORPORATION, Santa Clara, CA (US)

(72) Inventors: Damián Alfonso Morero, Córdoba (AR); Mario Rafael Hueda, Córdoba (AR); Oscar Ernesto Agazzi, Irvine, CA (US)

(73) Assignee: INPHI CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/703,637

(22) Filed: Dec. 4, 2019

(65) Prior Publication Data

US 2020/0112375 A1    Apr. 9, 2020

Related U.S. Application Data

(63) Continuation of application No. 16/151,094, filed on Oct. 3, 2018, now Pat. No. 10,530,492, which is a
(Continued)

(51) Int. Cl.
*H04B 10/61* (2013.01)
*H04L 25/03* (2006.01)
(Continued)

(52) U.S. Cl.
CPC ....... *H04B 10/6162* (2013.01); *H04B 10/079* (2013.01); *H04B 10/615* (2013.01);
(Continued)

(58) Field of Classification Search
CPC .. H04B 10/6161; H04B 10/079; H04B 10/40; H04B 10/615; H04B 10/616;
(Continued)

(56) References Cited

U.S. PATENT DOCUMENTS 4,669,116 A    5/1987   Agazzi et al.
5,870,372 A    2/1999   Kuribayashi
(Continued)

OTHER PUBLICATIONS

Andreas Leven et al., "Real-Time Implementation of Digital Signal Processing for Coherent Optical Digital Communication Systems", IEEE Journal of Selected Topics in Quantum Electronics, Sep./Oct. 2010, pp. 1227-1234, vol. 16, No. 5, IEEE.
(Continued)

*Primary Examiner* — Dalzid E Singh
(74) *Attorney, Agent, or Firm* — Richard T. Ogawa; Ogawa P.C

(57) ABSTRACT

A method and structure for signal propagation in a coherent optical receiver device. Asynchronous equalization helps to reduce complexity and power dissipation, and also improves the robustness of timing recovery. However, conventional devices using inverse interpolation filters ignore adaptation algorithms. The present invention provides for forward propagation and backward propagation. In the forward case, the filter input signal is forward propagated through a filter to the adaptation engine, while, in the backward case, the error signal is backward propagated through a filter to the asynchronous domain. Using such forward and backward propagation schemes reduces implementation complexity while providing optical device performance.

28 Claims, 7 Drawing Sheets

Related U.S. Application Data continuation of application No. 15/792,597, filed on Oct. 24, 2017, now Pat. No. 10,128,958.

(60) Provisional application No. 62/412,047, filed on Oct. 24, 2016, provisional application No. 62/412,039, filed on Oct. 24, 2016, provisional application No. 62/412,052, filed on Oct. 24, 2016, provisional application No. 62/412,071, filed on Oct. 24, 2016, provisional application No. 62/412,033, filed on Oct. 24, 2016, provisional application No. 62/412,015, filed on Oct. 24, 2016, provisional application No. 62/412,002, filed on Oct. 24, 2016.

(51) Int. Cl.
| | |
|---|---|
| *H04L 7/00* | (2006.01) |
| *H04L 27/26* | (2006.01) |
| *H04B 10/079* | (2013.01) |
| *H04L 1/00* | (2006.01) |
| *H04B 10/40* | (2013.01) |

(52) U.S. Cl.
CPC ....... *H04B 10/616* (2013.01); *H04B 10/6161* (2013.01); *H04B 10/6165* (2013.01); *H04L 1/0045* (2013.01); *H04L 7/0075* (2013.01); *H04L 25/03019* (2013.01); *H04L 25/03159* (2013.01); *H04L 27/2662* (2013.01); *H04L 27/2697* (2013.01); *H04B 10/40* (2013.01); *H04L 27/2634* (2013.01)

(58) Field of Classification Search
CPC ............ H04B 10/6165; H04B 10/6162; H04L 1/0045; H04L 7/0075; H04L 25/03019; H04L 25/03159; H04L 27/2662; H04L 27/2697; H04L 27/2634
USPC ........................................................ 398/209
See application file for complete search history.

(56) References Cited

U.S. PATENT DOCUMENTS

| | | | |
|---|---|---|---|
| 7,693,214 | B2 | 4/2010 | Shida |
| 7,894,728 | B1 | 2/2011 | Sun et al. |
| 8,244,142 | B2 | 8/2012 | Wagner et al. |
| 8,565,621 | B2 | 10/2013 | Ibragimov et al. |
| 8,634,726 | B2 | 1/2014 | Zhang et al. |
| 8,655,191 | B2 | 2/2014 | Kaneda et al. |
| 8,687,974 | B2 | 4/2014 | Zelensky et al. |
| 8,712,247 | B2 | 4/2014 | Hauske |
| 8,731,413 | B1 | 5/2014 | Dave et al. |
| 8,873,358 | B2 | 10/2014 | Saito et al. |
| 2006/0013590 | A1 | 1/2006 | Hueda et al. |
| 2007/0206963 | A1 | 9/2007 | Koc |
| 2008/0175590 | A1 | 7/2008 | Perkins et al. |
| 2009/0252497 | A1 | 10/2009 | Younce et al. |
| 2010/0329677 | A1 | 12/2010 | Kaneda et al. |
| 2011/0064421 | A1 | 3/2011 | Zhang et al. |
| 2011/0150506 | A1 | 6/2011 | Tanimura et al. |
| 2011/0229127 | A1 | 9/2011 | Sakamoto et al. |
| 2011/0243575 | A1* | 10/2011 | Yan ..................... H04L 25/0305 398/205 |
| 2011/0268459 | A1 | 11/2011 | Rollins et al. |
| 2012/0076181 | A1* | 3/2012 | Aziz ................. H04L 25/03057 375/219 |
| 2012/0096061 | A1 | 4/2012 | Hauske |
| 2012/0128377 | A1* | 5/2012 | Hatae .................... H04L 27/223 398/208 |
| 2012/0177156 | A1 | 7/2012 | Hauske et al. |
| 2012/0213510 | A1 | 8/2012 | Stojanovic |
| 2012/0219302 | A1 | 8/2012 | Sun et al. |
| 2012/0257652 | A1 | 10/2012 | Malipatil et al. |
| 2012/0269513 | A1 | 10/2012 | Abe |
| 2012/0288275 | A1 | 11/2012 | Zhang et al. |
| 2013/0039665 | A1 | 2/2013 | Hauske |
| 2013/0084080 | A1 | 4/2013 | Shibutani |
| 2013/0209089 | A1 | 8/2013 | Harley et al. |
| 2013/0243127 | A1 | 9/2013 | Chmelar et al. |
| 2013/0251082 | A1* | 9/2013 | Abe ....................... H04B 10/65 375/350 |
| 2013/0259490 | A1* | 10/2013 | Malouin ................ H04J 14/06 398/152 |
| 2013/0336647 | A1 | 12/2013 | Le Taillandier De Gabory et al. |
| 2013/0343490 | A1 | 12/2013 | Wertz et al. |
| 2014/0161470 | A1 | 6/2014 | Zelensky et al. |
| 2014/0254644 | A1 | 9/2014 | Gotman et al. |
| 2017/0149510 | A1* | 5/2017 | Bolshtyansky .... H04B 10/6163 |

OTHER PUBLICATIONS

Andrew J. Viterbi et al., "Nonlinear Estimation of PSK-Modulated Carrier Phase with Application to Burst Digital Transmission", IEEE Transactions on Information Theory, Jul. 1983, pp. 543-551, vol. 29, No. 4, IEEE.

David G. Messerschmitt, "Frequency Detectors for PLL Acquisition in Timing and Carrier Recovery", IEEE Transactions on Communications, Sep. 1979, p. 1288-1295, vol. COM-27, No. 9, IEEE.

Diego E. Crivelli et al., "Adaptive Digital Equalization in the Presence of Chromatic Dispersion, PMD, and Phase Noise in Coherent Fiber Optic Systems", IEEE 2004 Global Telecommunications Conference, Nov. 29-Dec. 3, 2004, p. 2545-2551, vol. 4, IEEE.

Fabian N. Hauske et al., "Optical Performance Monitoring in Digital Coherent Receivers", Journal of Lightwave Technology, Aug. 15, 2009, pp. 3623-3631, vol. 27, No. 16, IEEE.

H. Zhang et al., "Cycle Slip Mitigation in POLMUX-QPSK Modulation", Optical Fiber Communication Conference and Exposition (OFC/NFOEC), 2011 and the National Fiber Optic Engineers Conference, Mar. 2011, pp. 1-3, Optical Society of America.

J. C. Geyer et al., "Optical Performance Monitoring using a 43Gb/s Realtime Coherent Receiver (Invited)", 2009, pp. 93-94, IEEE.

J.C. Geyer et al., "Performance Monitoring Using Coherent Receivers", 2009, pp. 1-3, IEEE.

L. E. Nelson et al., "Performance of 46-Gbps Dual-Polarization QPSK Transceiver With Real-Time Coherent Equalization Over High PMD Fiber", Journal of Lightwave Technology, Feb. 1, 2009, p. 158-167, vol. 27, No. 3, IEEE.

M. Kuschnerov et al., "DSP for Coherent Single-Carrier Receivers", Journal of Lightwave Technology, Aug. 15, 2009, p. 3614-3622, vol. 27, No. 16, IEEE.

Manar El-Chammas et al., "A 12-GS/s 81-mW 5-bit Time-Interleaved Flash ADC With Background Timing Skew Calibration", IEEE Journal Solid-State Circuits, Apr. 2011, pp. 838-847, vol. 46, No. 4, IEEE.

Oscar Agazzi et al., "Timing Recovery in Digital Subscriber Loops," IEEE Transactions on Communications, Jun. 1985, p. 558-569, vol. COM-33, No. 6, IEEE.

Oscar E. Agazzi et al., "Maximum-Likelihood Sequence Estimation in Dispersive Optical Channels", Journal of Lightwave Technology, Feb. 2005, pp. 749-763, vol. 23, No. 2, IEEE.

Shaoliang Zhang et al., "Pilot-Assisted Decision-Aided Maximum-Likelihood Phase Estimation in Coherent Optical Phase-Modulated Systems with Nonlinear Phase Noise", IEEE Photonics Technology Letters, Mar. 15, 2010, pp. 380-382, vol. 22, No. 6, IEEE.

Timo Pfau et al., "Hardware-Efficient Coherent Digital Receiver Concept with Feedforward Carrier Recovery for M-QAM Constellations", Journal of Lightwave Technology, Apr. 15, 2009, pp. 989-999, vol. 27, No. 8, IEEE.

Un-Ku Moon et al., "Timing Recovery in CMOS using Nonlinear Spectral-line Method", IEEE 1996 Custom Integrated Circuits Conference, 1996, pp. 13-16, IEEE.

Xiaofu Wu et al., "Iterative Carrier Recovery in Turbo Receivers with Distributed Pilots", IEEE International Conference on Consumer Electronics, Communications and Networks (CECNet), Apr. 2011, pp. 5024-5026, IEEE.

(56) References Cited

OTHER PUBLICATIONS

Yuriy M Greshishchev et al., "A 40GS/s 6b ADC in 65nm CMOS", IEEE International Solid-State Circuits Conference, Feb. 10, 2010, pp. 390-392, IEEE.

* cited by examiner

FORWARD AND BACKWARD PROPAGATION METHODS AND STRUCTURES FOR COHERENT OPTICAL RECEIVER

CROSS-REFERENCES TO RELATED APPLICATIONS

The present application is a continuation of U.S. patent application Ser. No. 16/151,094 filed Oct. 3, 2018, which is a continuation of U.S. patent application Ser. No. 15/792, 597 filed Oct. 24, 2017, now issued as U.S. Pat. No. 10,128,958 on Nov. 13, 2018, which claims priority to and incorporates by reference, for all purposes, the following U.S. provisional patent applications: U.S. Provisional App. No. 62/412,052, filed on Oct. 24, 2016; U.S. Provisional App. No. 62/412,071, filed on Oct. 24, 2016; U.S. Provisional App. No. 62/412,033, filed on Oct. 24, 2016; U.S. Provisional App. No. 62/412,047, filed on Oct. 24, 2016; U.S. Provisional App. No. 62/412,015, filed on Oct. 24, 2016; U.S. Provisional App. No. 62/412,002, filed on Oct. 24, 2016; and U.S. Provisional App. No. 62/412,039, filed on Oct. 24, 2016. The present application also incorporates by reference, for all purposes, the following U.S. Patents: U.S. Pat. No. 9,337,934, filed on Nov. 29, 2013, and issued on May 10, 2016; U.S. Pat. No. 9,178,625, filed on Dec. 3, 2013, and issued on Nov. 3, 2015; and U.S. Pat. No. 9,077,572, filed on Jan. 17, 2013, and issued on Jul. 7, 2015.

BACKGROUND OF THE INVENTION

The present invention relates to communication systems and integrated circuit (IC) devices. More particularly, the present invention provides for improved methods and devices for optical communication.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Optical communication is one major technological area that is growing to address these high demands on data. Optical communication systems typically communicate data over a plurality of channels corresponding to different phases and/or polarizations of the optical signal. While the data communicated over the different channels is typically aligned relative to a common clock when transmitted by the transmitter, delay (or skew) may be introduced into one or more of the channels based on characteristics of the transmitter, receiver, and/or the optical fiber. As a result, the relative timing of the data in the various channels may be misaligned at the receiver, causing degradation of the recovered data.

Although there are several types of devices and methods related to optical communication systems, they have been inadequate for the advancement of various applications. Conventional embodiments consume large areas or large amounts of power and suffer from performance limitations. Therefore, improved devices and methods for optical communication systems and related electronics are highly desired.

BRIEF SUMMARY OF THE INVENTION

The present invention relates to communication systems and integrated circuit (IC) devices. More particularly, the present invention provides for improved methods and devices for optical communication.

The present invention provides a method and structure for an optical receiver implementing forward propagation. The receiver can include a channel module receiving an input signal ($x_k$) and outputting a channel output ($y_k$). An equalizer filter module can be coupled to the channel module and can be configured to equalize a gain response of the input signal over a wavelength range, resulting in an equalizer output ($s_k$). The equalizer filter function coefficients are represented by [$f_0, f_1, \ldots, f_{q-1}$].

In an example, a first filter module is coupled to the equalizer filter module; here, the first filter module is a first known filter with function coefficients represented by [$g_0, g_1, \ldots, g_{p-1}$]. The output of this first known filter is the first filter output ($z_k$). A second filter module is coupled to the channel module and the equalizer filter module, receiving the channel output. The second filter module is a second known filter with the same function coefficients [$g_0, g_1, \ldots, g_{p-1}$]. The second filter module outputs a second filter output ($\tilde{y}_k$).

In an example, a combining module is coupled to the first filter module, receiving the first filter output. A delay module is coupled to the combining module, the delay module receiving the input signal and outputting a delayed input signal ($x_{k-d}$) to the combining module. The combining module is configured to obtain an error signal ($e_k$) by the summing the first filter signal terms and subtracting the delayed input terms. An adaptation engine module is coupled to the second filter module, the equalizer filter module, and the combining module. The adaptation engine is configured to compute a forward formulation stochastic gradient, which is outputted in a loop to the equalizer filter module.

The present invention provides a method and structure for an optical receiver implementing backward propagation. The receiver can include a channel module receiving an input signal ($x_k$) and outputting a channel output ($y_k$). An equalizer filter module can be coupled to the channel module and can be configured to equalize a gain response of the input signal over a wavelength range, resulting in an equalizer output ($s_k$). The equalizer filter function coefficients are represented by [$f_0, f_1, \ldots, f_{q-1}$].

In an example, a first filter module is coupled to the equalizer filter module; here, the first filter module is a first known filter with function coefficients represented by [$g_0, g_1, \ldots, g_{p-1}$]. The output of this first known filter is the first filter output ($z_k$). A combining module is coupled to the first filter module, receiving the first filter output and outputting an error signal ($e_k$). A second filter module is coupled to the combining module receiving the output of the combining module. The second filter module is a second known filter with the same function coefficients [$g_0, g_1, \ldots, g_{p-1}$]. The second filter module outputs a second filter output ($\tilde{e}_k$).

In an example, a first delay module is coupled to the combining module, the first delay module receiving the input signal and outputting a delayed input signal ($x_{k-d}$) to the combining module. The combining module is configured to obtain the error signal ($e_k$) by the summing the first filter signal terms and subtracting the delayed input terms. A second delay module is coupled to the channel module. The second delay module receives the channel output signal and outputs a delayed channel output signal. An adaptation engine module is coupled to the second filter module, the equalizer filter module, and the second delay module. The adaptation engine is configured to compute a backward formulation stochastic gradient, which is outputted in a loop to the equalizer filter module.

Many benefits can be achieved through various examples of the present invention. Asynchronous equalization helps to reduce complexity and power dissipation, and also improves the robustness of timing recovery. The present invention provides for both forward propagation and backward propagation approaches for the equalizer adaptation. In the forward case, the filter input signal is forward propagated through a new filter to the adaptation engine, while, in the backward case, the error signal is backward propagated to the asynchronous domain by using a new transversal filter. Using such forward and backward propagation schemes reduces implementation complexity while providing optical device performance.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention the presently described embodiments and the presently understood best mode of the invention are described with additional detail through the use of the accompanying drawings in which.

DETAILED DESCRIPTION OF THE INVENTION

Figure 1:
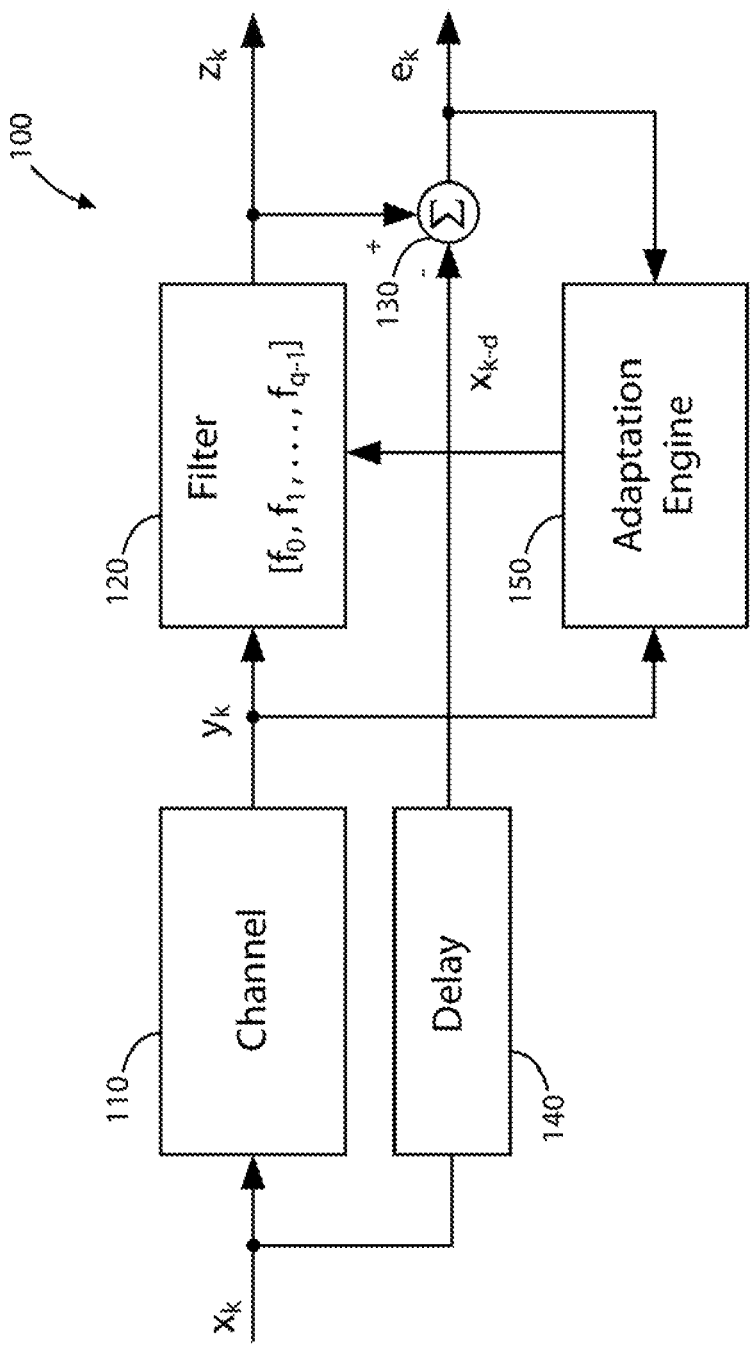
FIG. 1 is a simplified diagram illustrating a coherent optical receiver according to a conventional example using a classical equalization scheme.

The present invention relates to communication systems and integrated circuit (IC) devices. More particularly, the present invention provides for improved methods and devices for optical communication.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Digital data receivers often operate at a fixed sampling rate 1/Ts that is synchronous to the baud rate 1/T. Performing digital equalization of the digital receiver in the clock domain that is asynchronous to the baud rate can be an attractive for taking advantage of the benefits of digital technology. Such an approach can reduce the complexity and power dissipation in the equalizer of the receiver. This asynchronous equalization can also increase the robustness of the timing recovery algorithm. Thus, examples of the present invention provide for asynchronous equalizers and methods of operating therefor. More particularly, the present invention provides methods of implementing propagation algorithms in digital data receivers and the resulting receiver architectures.

The gradient descent (GD) is a first-order optimization algorithm that iteratively finds a local minimum of a function (e.g., cost function) by taking small steps proportional to the negative of the gradient of the function at the current point. This convergence speed and error of this minimization method is controlled by an update step term, which tends to be a small real number. A regularization term can be added to the cost function as a penalty typically related to the complexity of the parameters. Applications of regularization in adaptive filters include tap leakage and other like algorithms.

The stochastic gradient descent (SGD) is a stochastic approximation of the GD optimization method for minimizing an objecting function F(x) that can be expressed as the summation of m functions $F_j(x)$ with j=0, 1, . . . , m−1. The SGD method uses a selection criteria to select a value from the set {0, 1, . . . , m−1} to determine the particular function $F_j(x)$ used in a particular iterative step; the selection criteria to select this value can be random, pseudo-random, or non-random (e.g., n mod (m) is a typical criteria). Compared to the GD algorithm, the SGD algorithm requires a small update step term, but can provide a lower complexity approach to achieving a desired error energy when the computational complexity of evaluating the gradient is high.

FIG. 1 is a simplified diagram illustrating a coherent optical receiver according to a conventional example using a classical equalization scheme. As shown, the receiver 100 includes a channel module 110, a filter module 120, a delay module 130, and a combining module 140. The channel module 110 receives an input signal and outputs to the filter module 120, which filters the input signal according to a filter function. The delay module 130 receives the input signal and outputs the delayed input signal to the combining module 140. The combining module is configured to compute an error signal from the delayed input signal and the filtered input signal. An adaptation engine 150 is configured to compute a gradient descent to determine the filter coefficients in order to minimize a metric cost function. A discussion of the improvements to this architecture is described in FIGS. 2-7 below.

Figure 2:
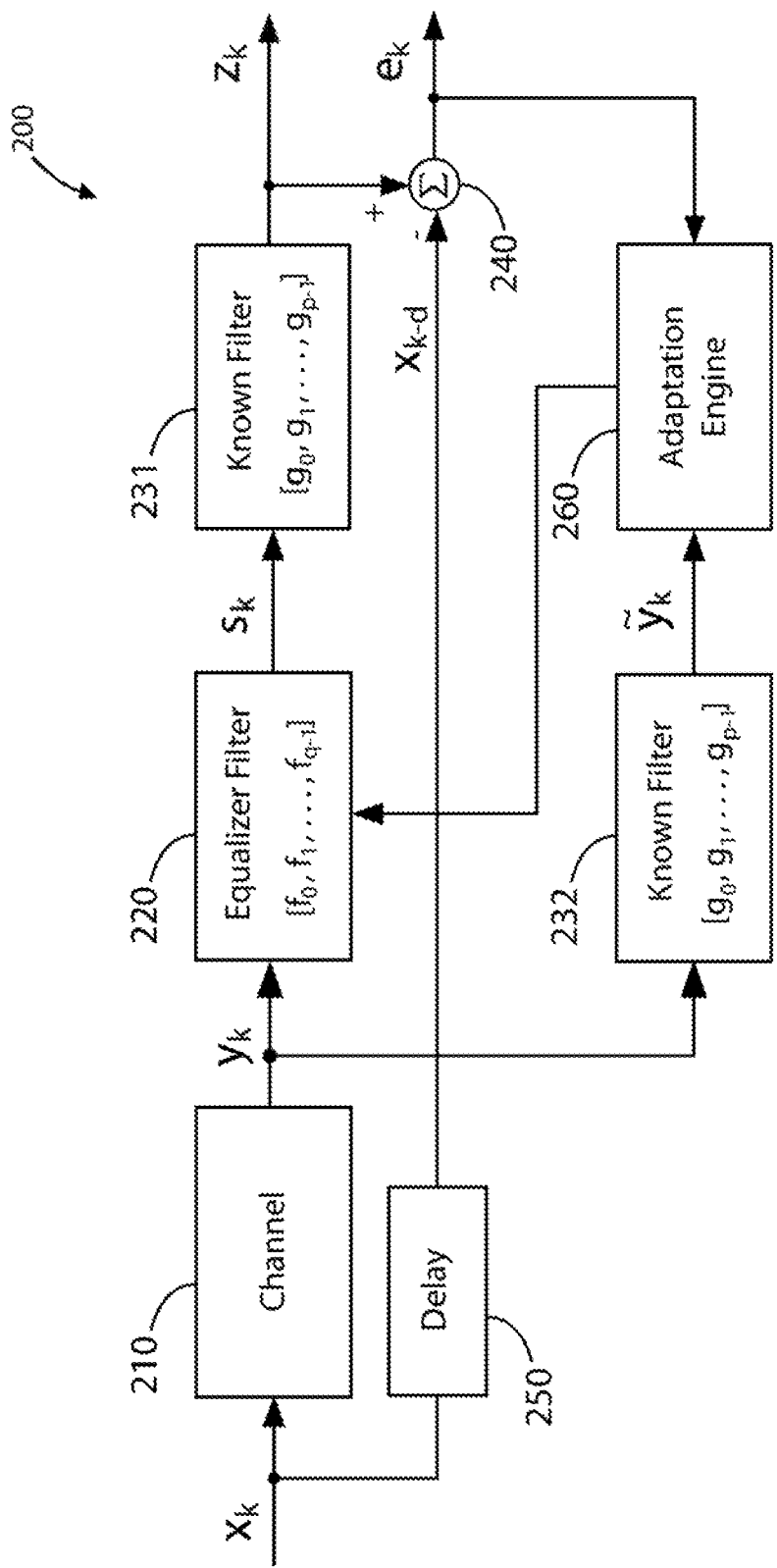
FIG. 2 is a simplified diagram illustrating a coherent optical receiver implementing a forward propagation algorithm according to an example of the present invention.

In an example, the present invention provides for a method of stochastic gradient descent (SGD) in a forward formulation (FF) and the resulting receiver structure. FIG. 2 is a simplified diagram illustrating a coherent optical receiver implementing a forward propagation algorithm according to an example of the present invention. As shown, the receiver 200 can include a channel module 210 receiving an input signal ($x_k$) and outputting a channel output ($y_k$). An equalizer filter module 220 can be coupled to the channel module 210 and can be configured to equalize a gain response of the input signal over a wavelength range, resulting in an equalizer output ($s_k$). FIG. 2 shows that the equalizer filter function coefficients are represented by [$f_0$, $f_1$, . . . , $f_{q-1}$].

The following two filter modules vary across the different examples of the present invention discussed in FIGS. 2-7. In an example, a first filter module 231 is coupled to the equalizer filter module; here, the first filter module is a first known filter with function coefficients represented by [$g_0$, $g_1$, . . . , $g_{p-1}$]. The output of this first known filter 231 is the first filter output ($z_k$). A second filter module 232 is coupled to the channel module 210 and the equalizer filter module 220, receiving the channel output. The second filter module is a second known filter with the same function coefficients [$g_0$, $g_1$, . . . , $g_{p-1}$]. The second filter module 232 outputs a second filter output ($\tilde{y}_k$).

In an example, a combining module 240 is coupled to the first filter module 231, receiving the first filter output. A delay module 250 is coupled to the combining module 240, the delay module 250 receiving the input signal and outputting a delayed input signal ($x_{k-d}$) to the combining module 240. The combining module is configured to obtain an error signal ($e_k$) by the summing the first filter signal terms and subtracting the delayed input terms. An adaptation engine module 260 is coupled to the second filter module 232, the equalizer filter module 220, and the combining module 240. The adaptation engine is configured to compute a forward formulation stochastic gradient, which is outputted in a loop to the equalizer filter module 220. The derivation with regard to the forward formulation stochastic gradient for a known filter is discussed below.

The iterative computation of the filter coefficients is as follows:

$$f^{(k+1)} = f^{(k)} - \gamma_k \nabla e_k^2$$

Following the above, the stochastic gradient is as follows:

$$\nabla e_k^2 = \left[ \frac{\partial}{\partial f_0} e_k^2, \frac{\partial}{\partial f_1} e_k^2, \ldots, \frac{\partial}{\partial f_{q-1}} e_k^2 \right]$$

Solving for each component of the gradient, the result is as follows:

$$\frac{\partial}{\partial f_1} e_k^2 = 2e_k \frac{\partial}{\partial f_1} e_k = 2e_k \frac{\partial}{\partial f_1} (z_k - x_{k-d}) =$$

$$2e_k \frac{\partial}{\partial f_1} \left( \sum_{j=0}^{p-1} g_j \sum_{i=0}^{q-1} f_i y_{k-j-i} - x_{k-d} \right) = 2e_k \sum_{j=0}^{p-1} g_j y_{k-i-j}$$

where the term $\sum_{j=0}^{p-1} g_j y_{k-j-i}$ is denoted as $\tilde{y}_{k-i}$. Therefore $\nabla e_k^2 = 2e_k[\tilde{y}_k, \tilde{y}_{k-1}, \ldots, \tilde{y}_{k-q+1}]$ where $\tilde{y}_k$ is $y_k$ filtered by [$g_0$, $g_1$, . . . , $g_{p-1}$].

Here, at each adaptation step, one sample of the error $e_k$ is combined with a filtered version ($\tilde{y}_k$) of filter input $y_k$. This represents the method and structure of a receiver implementing SGD in a forward formulation or SGD in the error domain. Those of ordinary skill in the art will recognize other variations, modifications, and alternatives.

Figure 3:
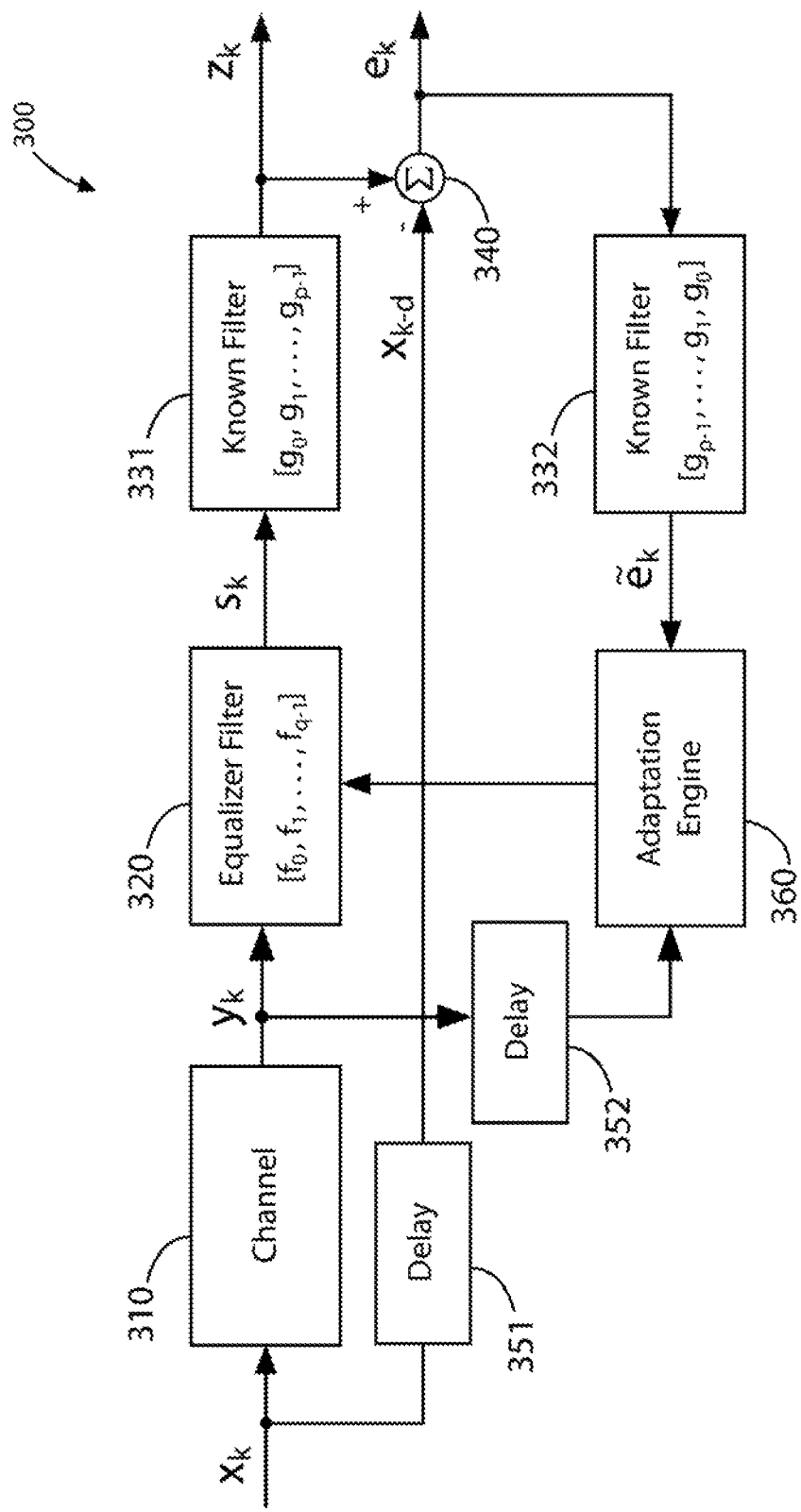
FIG. 3 is a simplified diagram illustrating a coherent optical receiver implementing a backward propagation algorithm according to an example of the present invention.

In an example, the present invention provides for a method of stochastic gradient descent (SGD) in a backward formulation (BF). FIG. 3 is a simplified diagram illustrating a coherent optical receiver implementing a backward propagation algorithm according to an example of the present invention. As shown, the receiver 300 can include a channel module 310 receiving an input signal ($x_k$) and outputting a channel output ($y_k$). An equalizer filter module 220 can be coupled to the channel module 210 and can be configured to equalize a gain response of the input signal over a wavelength range, resulting in an equalizer output ($s_k$). FIG. 3 shows that the equalizer filter function coefficients are represented by [$f_0$, $f_1$, . . . , $f_{q-1}$].

Similar to the case in FIG. 2, the following two filter modules vary across the different examples of the present invention discussed in FIGS. 2-7. In an example, a first filter module 331 is coupled to the equalizer filter module; here, the first filter module is a first known filter with function coefficients represented by [$g_0$, $g_1$, . . . , $g_{p-1}$]. The output of this first known filter 331 is the first filter output ($z_k$). A combining module 340 is coupled to the first filter module 331, receiving the first filter output and outputting an error signal ($e_k$). A second filter module 332 is coupled to the combining module 340 receiving the output of the combining module 340. The second filter module is a second known filter with the same function coefficients [$g_0$, $g_1$, . . . , $g_{p-1}$]. The second filter module 332 outputs a second filter output ($\tilde{e}_k$).

In an example, a first delay module 351 is coupled to the combining module 340, the first delay module 351 receiving the input signal and outputting a delayed input signal ($x_{k-d}$) to the combining module 340. The combining module is configured to obtain the error signal ($e_k$) by the summing the first filter signal terms and subtracting the delayed input terms. A second delay module 352 is coupled to the channel module 310. The second delay module 352 receives the channel output signal and outputs a delayed channel output signal. An adaptation engine module 360 is coupled to the second filter module 332, the equalizer filter module 320, and the second delay module 352. The adaptation engine is configured to compute a backward formulation stochastic gradient, which is outputted in a loop to the equalizer filter module 320. The derivation with regard to the backward formulation stochastic gradient for a known filter is discussed below.

From the previous example, the stochastic (instantaneous) gradient is as follows:

$$\nabla e_k^2 = 2e_k[\tilde{y}_k, \tilde{y}_{k-1}, \ldots, \tilde{y}_{k-q-1}]$$

where $\tilde{y}_{k-i} = \sum_{j=0}^{p-1} g_j y_{k-j-i}$. Further derivations results as follows:

$$\nabla e_k^2 = 2e_k \left[ \sum_{j=0}^{p-1} g_j y_{k-j}, \sum_{j=0}^{p-1} g_j y_{k-j-1}, \ldots, \sum_{j=0}^{p-1} g_j y_{k-j-q+1} \right] =$$

$$2e_k \sum_{j=0}^{p-1} g_j [y_{k-j}, y_{k-j-1}, \ldots, y_{k-j-q+1}]$$

where $e_k^2$ is summed over all available values of k (ideally $k \in (-\infty, \infty)$).

Restructuring the gradient equation results as follows:

$$\nabla \sum_k e_k^2 = 2 \sum_k e_k \sum_{j=0}^{p-1} g_j [y_{k-j}, y_{k-j-1}, \ldots, y_{k-j-q+1}]$$

Introducing variable n=k−j results as follows:

$$\nabla \sum_k e_k^2 = 2 \sum_n \sum_{j=0}^{p-1} e_{n+j} g_j [y_n, y_{n-1}, \ldots, y_{n-q+1}]$$

$$= 2 \sum_n \tilde{e}_n [y_n, y_{n-1}, \ldots, y_{n-q+1}]$$

where $\tilde{e}_n = \sum_{j=0}^{p-1} g_j e_{n+j}$. Therefore, a new stochastic gradient based on $\tilde{e}_n$ is as follows:

$$\nabla e_k^2 = 2\tilde{e}_n [y_n, y_{n-1}, \ldots, y_{n-q+1}]$$

where $\tilde{e}_n$ is $e_n$ filtered by coefficients $g_j$ in reverse order.

Thus, the backward propagation of the error can be represented as follows:

$$\tilde{e}_n = \sum_{j=0}^{p-1} g_j e_{n+j}$$

Further, the zero order backward propagation of the error is as follows:

$$\tilde{e}_n = e_{n+\frac{p-1}{2}}$$

Figure 4:
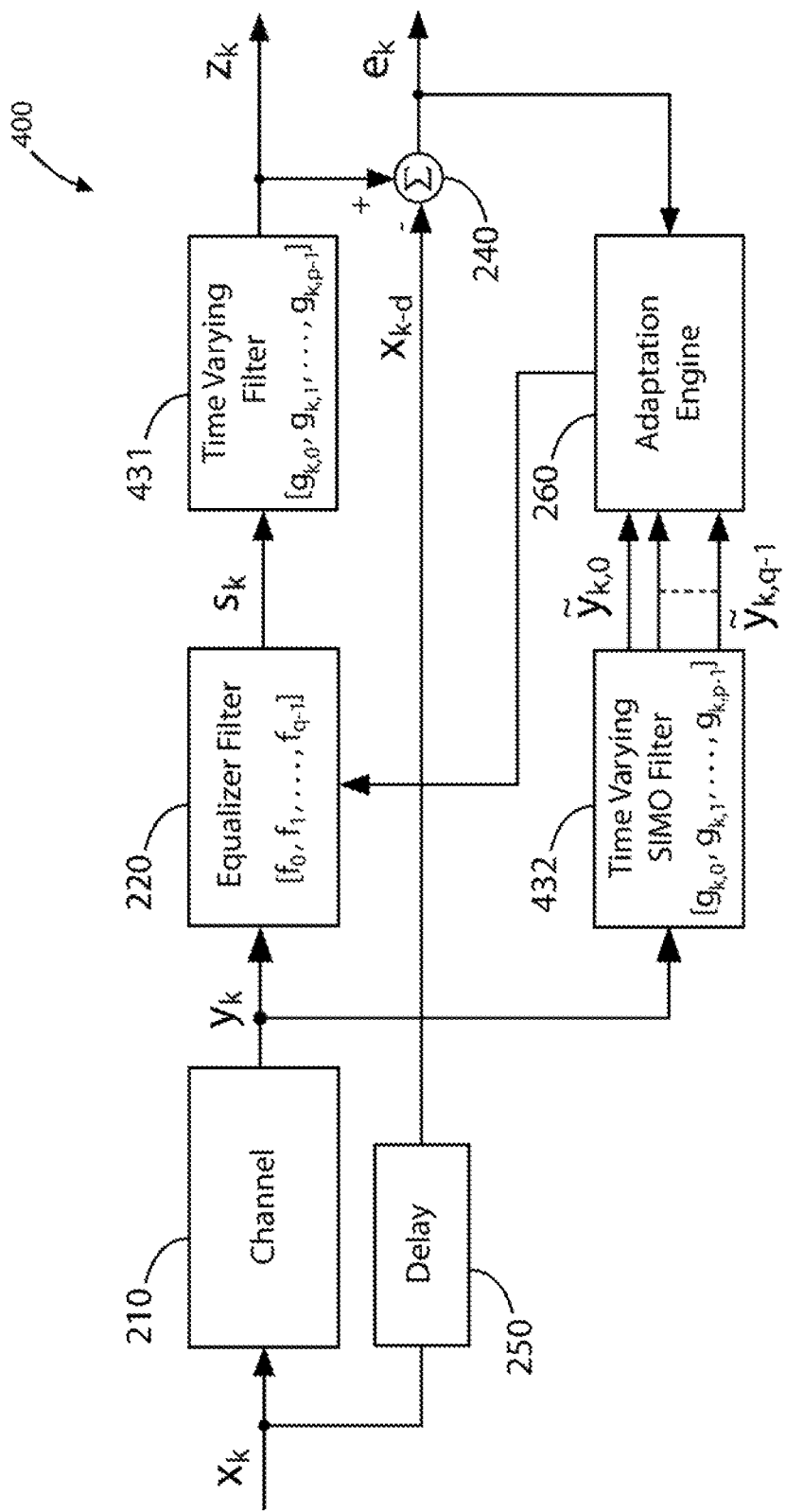
FIG. 4 is a simplified diagram illustrating a coherent optical receiver, with time varying internal filters, implementing a forward propagation algorithm according to an example of the present invention.

Here, at each adaptation step, the filter input samples $y_k$ are combined with a filtered version ($\tilde{e}_k$) of error $e_k$. This represents the method and structure of a receiver implementing SGD in a backward formulation or SGD in the signal domain. Similar to the discussion in reference to FIG. 2, those of ordinary skill in the art will recognize other variations, modifications, and alternatives In an example, the present invention provides for a method of stochastic gradient descent (SGD) in a forward formulation (FF) using a time varying internal filter. FIG. 4 is a simplified diagram illustrating a coherent optical receiver implementing a forward propagation algorithm according to an example of the present invention. As shown, receiver 400 is structurally similar to receiver 200, except that the first filter module 431 is a time varying filter and the second filter module 432 is a time varying single-input multiple-output (SIMO) filter. The first filter function coefficients are still represented by [$g_0, g_1, \ldots, g_{p-1}$], but the second filter function coefficients are represented by [$g_{k,0}, g_{k,1}, \ldots, g_{k,p-1}$]. The derivation with regard to the forward formulation stochastic gradient for a time varying filter is discussed below.

From before, the stochastic gradient is:

$$\nabla e_k^2 = \left[ \frac{\partial}{\partial f_0} e_k^2, \frac{\partial}{\partial f_1} e_k^2, \ldots, \frac{\partial}{\partial f_{q-1}} e_k^2 \right]$$

Solving for each component of the gradient, the result is as follows:

$$\frac{\partial}{\partial f_1} e_k^2 = 2e_k \frac{\partial}{\partial f_1} e_k = 2e_k \frac{\partial}{\partial f_1}(z_k - x_{k-d}) =$$

$$2e_k \frac{\partial}{\partial f_1} \left( \sum_{j=0}^{p-1} g_j \sum_{i=0}^{q-1} f_i y_{k-j-i} - x_{k-d} \right) = 2e_k \sum_{j=0}^{p-1} g_{k,j} y_{k-i-j}$$

where the term $\sum_{j=0}^{p-1} g_{k,j} y_{k-j-i}$ is denoted as $\tilde{y}_{k,i}$. Therefore $\nabla e_k^2 = 2e_k[\tilde{y}_{k,0}, \tilde{y}_{k,1}, \ldots, \tilde{y}_{k,q-1}]$ where $[\tilde{y}_{k,0}, \tilde{y}_{k,1}, \ldots, \tilde{y}_{k,q-1}]$ is as follows:

$$\begin{bmatrix} \tilde{y}_{k,0} \\ \tilde{y}_{k,1} \\ \vdots \\ \tilde{y}_{k,q-1} \end{bmatrix} = \begin{bmatrix} g_{k,0} & g_{k,1} & \cdots & g_{k,q+1} & 0 & \cdots & 0 \\ 0 & g_{k,0} & g_{k,1} & \ddots & g_{k,q+1} & \cdots & 0 \\ \vdots & \ddots & \ddots & \ddots & \ddots & \ddots & \vdots \\ 0 & \cdots & 0 & g_{k,0} & g_{k,1} & \cdots & g_{k,q+1} \end{bmatrix} = \begin{bmatrix} y_k \\ y_{k-1} \\ \vdots \\ y_{k-p-q+2} \end{bmatrix}$$

Here, at each adaptation step, one sample of the error $e_k$ is combined with a filtered version ($\tilde{y}_k$) of filter input $y_k$, similar to method described in reference to FIG. 2. This represents the method and structure of a receiver with an internal time varying filter implementing SGD in a forward formulation or SGD in the error domain. As discussed previously, there can be other variations, modifications, and alternatives.

Figure 5:
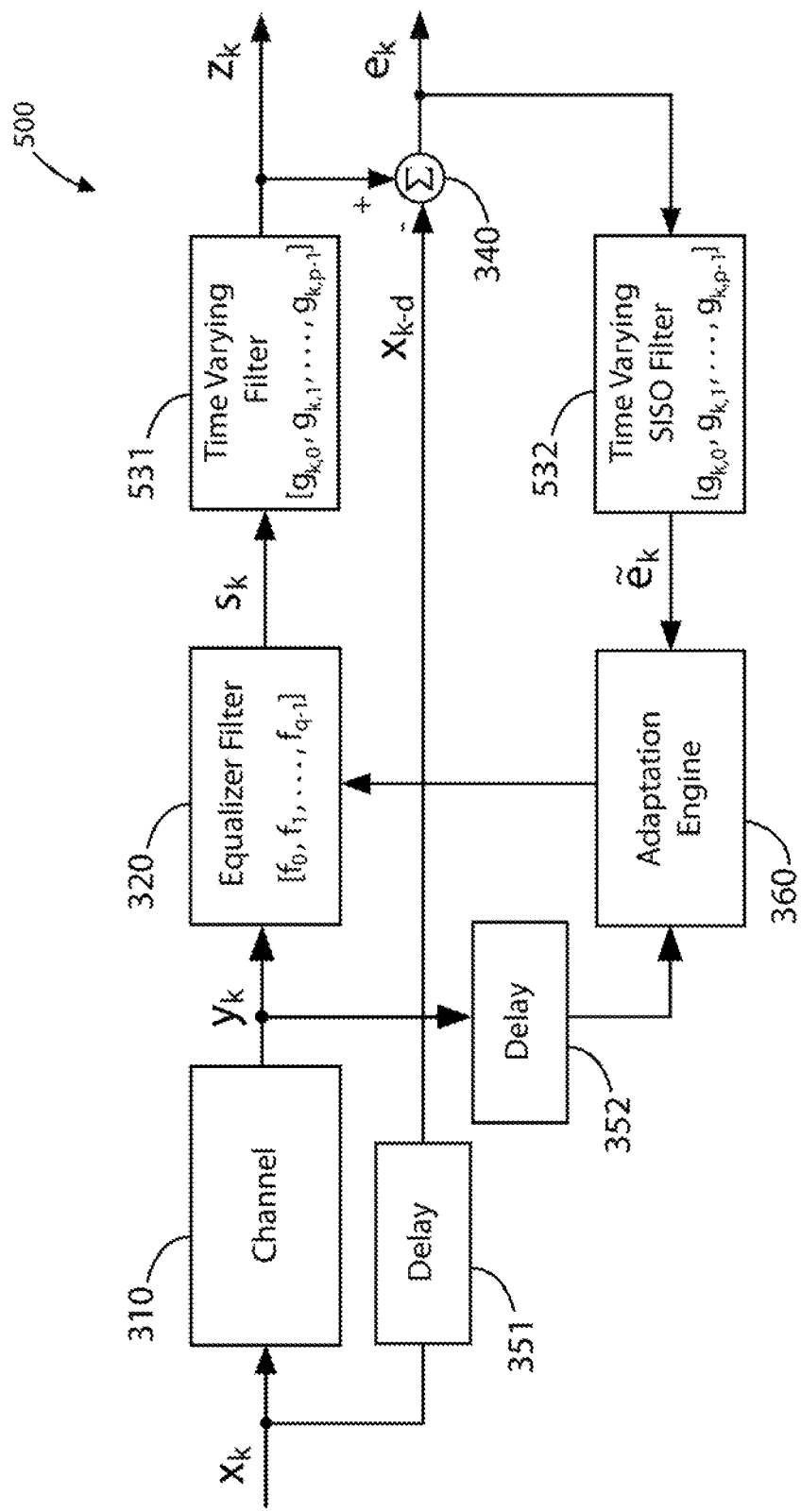
FIG. 5 is a simplified diagram illustrating a coherent optical receiver, with time varying filters, implementing a backward propagation algorithm according to an example of the present invention.

In an example, the present invention provides for a method of stochastic gradient descent (SGD) in a backward formulation (BF) using a time varying internal filter. FIG. 5 is a simplified diagram illustrating a coherent optical receiver implementing a backward propagation algorithm according to an example of the present invention. As shown, receiver 500 is structurally similar to receiver 300, except that the first filter module 531 is a time varying filter and the second filter module 532 is a time varying single-input single-output (SISO) filter. The second filter function coefficients are still represented by $[g_0, g_1, \ldots, g_{p-1}]$, but the first filter function coefficients are represented by $[g_{k,0}, \ldots, g_{k,1}, \ldots, g_{k,p-1}]$. The derivation with regard to the backward formulation stochastic gradient for a time varying filter is discussed below.

From the previous example, the stochastic (instantaneous) gradient is as follows:

$$\nabla e_k^2 = 2e_k[\tilde{y}_{k,0}, \tilde{y}_{k,1}, \ldots, \tilde{y}_{k,q-1}]$$

where $\tilde{y}_{k,i} = \sum_{j=0}^{p-1} g_{k,j} y_{k-i-j}$. Further derivations result as follows:

$$\nabla e_k^2 = 2e_k \left[ \sum_{j=0}^{p-1} g_{k,j} y_{k-j}, \sum_{j=0}^{p-1} g_{k,j} y_{k-j-1}, \ldots, \sum_{j=0}^{p-1} g_{k,j} y_{k-j-q+1} \right] =$$

$$2e_k \sum_{j=0}^{p-1} g_{k,j} [y_{k-j}, y_{k-j-1}, \ldots, y_{k-j-q+1}]$$

Therefore, the average gradient is as follows:

$$\nabla \sum_k e_k^2 = 2 \sum_k e_k \sum_{j=0}^{p-1} g_{k,j} [y_{k-j}, y_{k-j-1}, \ldots, y_{k-j-q+1}]$$

where $e_k^2$ is summed over all available values of k (ideally $k \in (-\infty, \infty)$).

Restructuring the gradient equation and introducing variable n=k-j results as follows:

$$\nabla \sum_k e_k^2 = 2 \sum_n \sum_{j=0}^{p-1} g_{n+j,j} e_{n+j} [y_n, y_{n-1}, \ldots, y_{n-q+1}] =$$

$$2 \sum_n \tilde{e}_n [y_n, y_{n-1}, \ldots, y_{n-q+1}]$$

where $\tilde{e}_n = \sum_{j=0}^{p-1} g_{n+j,j} e_{n+j}$. Therefore, a new stochastic gradient based on $\tilde{e}_n$ is as follows:

$$\nabla e_k^2 = 2\tilde{e}_n [y_n, y_{n-1}, \ldots, y_{n-q+1}]$$

where $\tilde{e}_n$ is $e_k$ back-propagated to the equalizer output.

Thus, the backward propagation of the error can be represented as follows:

$$\tilde{e}_n = \sum_{j=0}^{p-1} g_{n+j,j} e_{n+j}$$

Further, the zero order backward propagation of the error is as follows:

$$\tilde{e}_n = e_{n+\frac{p-1}{2}}$$

Here, at each adaptation step, the filter input samples $y_k$ are combined with a filtered version ($\tilde{e}_k$) of error $e_k$. This represents the method and structure of a receiver with a time varying internal filter implementing SGD in a backward formulation or SGD in the signal domain. As discussed previously, there can be other variations, modifications, and alternatives.

Figure 6:
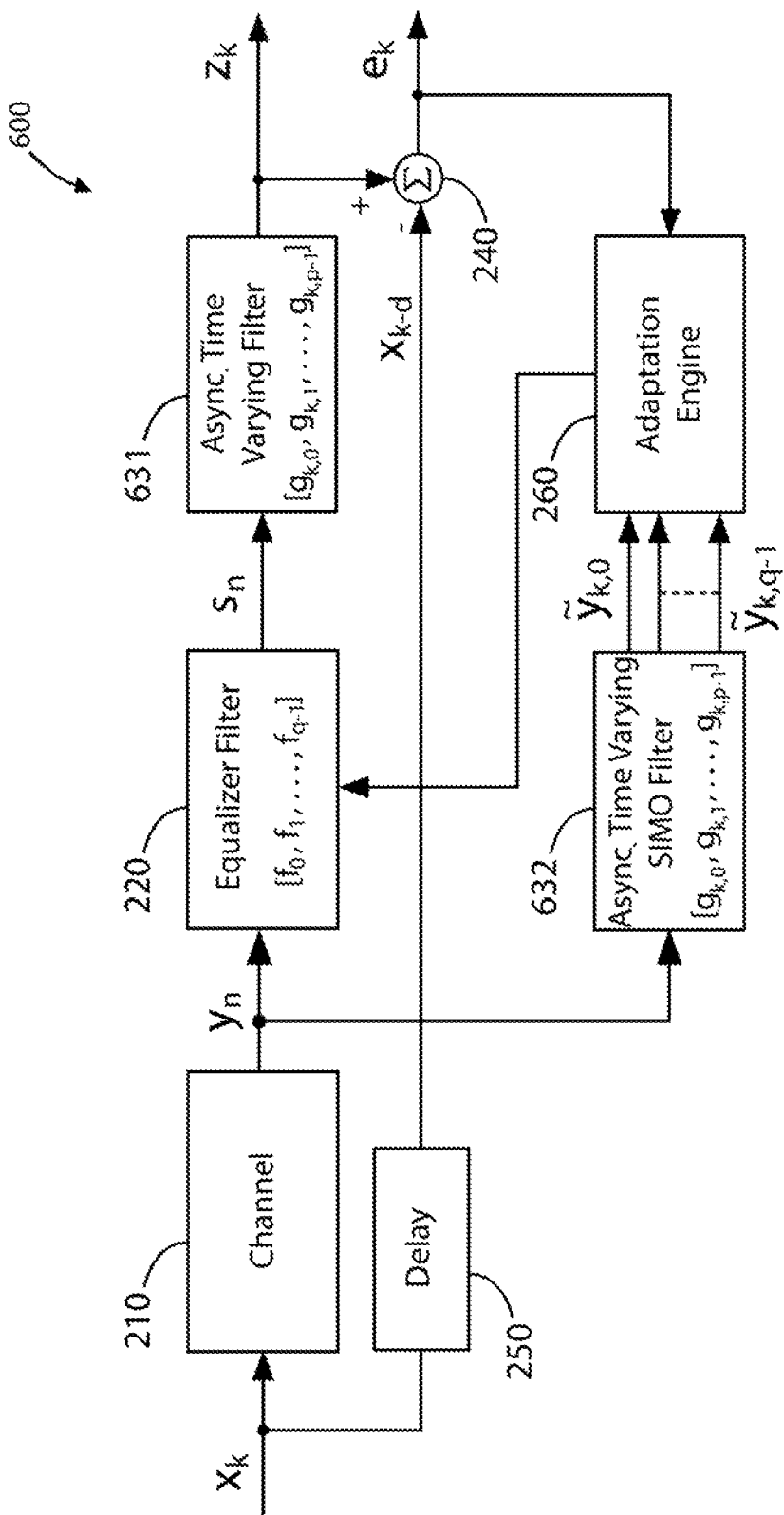
FIG. 6 is a simplified diagram illustrating a coherent optical receiver, with asynchronous time varying filters, implementing a forward propagation algorithm according to an example of the present invention.

In an example, the present invention provides for a method of stochastic gradient descent (SGD) in a backward formulation (BF) with an asynchronous time varying internal filter. FIG. 6 is a simplified diagram illustrating a coherent optical receiver implementing a forward propagation algorithm according to an example of the present invention. As shown, receiver 600 is structurally similar to receiver 200, except that the first filter module 631 is an asynchronous time varying filter and the second filter module 632 is an asynchronous time varying SIMO filter. Here, the first filter function coefficients and the second filter function coefficients are represented by $[g_{k,0}, g_{k,1}, \ldots, g_{k,p-1}]$. The derivation with regard to the forward formulation stochastic gradient for an asynchronous time varying filter is discussed below.

Considering asynchronous sampling, and assuming variable $$k = \left\lfloor \frac{a}{b} n \right\rfloor$$

where a and b are integers such that a≤b, the output of the asynchronous time varying filter is given as follows:

$$z_k = \sum_{j=0}^{p-1} g_{k,j} s_{\lfloor \frac{b}{a} k \rfloor - j} = \sum_{j=0}^{p-1} g_{k,j} \sum_{i=0}^{q-1} f_i y_{\lfloor \frac{b}{a} k \rfloor - j - i}$$

where $s_{\lfloor \frac{b}{a} k \rfloor - j} = \sum_{i=0}^{q-1} f_i y_{\lfloor \frac{b}{a} k \rfloor - j - i}$.

As from before, the stochastic gradient is as follows:

$$\nabla e_k^2 = \left[ \frac{\partial}{\partial f_0} e_k^2, \frac{\partial}{\partial f_1} e_k^2, \ldots, \frac{\partial}{\partial f_{q-1}} e_k^2 \right]$$

Solving for each component of the gradient, the result is as follows:

$$\frac{\partial}{\partial f_1} e_k^2 = 2e_k \frac{\partial}{\partial f_1} e_k = 2e_k \frac{\partial}{\partial f_1} (z_k - x_{k-d}) =$$

$$2e_k \frac{\partial}{\partial f_1} \left( \sum_{j=0}^{p-1} g_{k,j} \sum_{i=0}^{q-1} f_i y_{\lfloor \frac{b}{a} k \rfloor - j - i} - x_{k-d} \right) = 2e_k \sum_{j=0}^{p-1} g_{k,j} y_{\lfloor \frac{b}{a} k \rfloor - i - j}$$

where the term $$\sum_{j=0}^{p-1} g_{k,j} y_{\lfloor \frac{b}{a} k \rfloor - j - i}$$

is denoted as $\tilde{y}_{k,i}$. Therefore $\nabla e_k^2 = 2e_k[\tilde{y}_{k,0}, \tilde{y}_{k,1}, \ldots, \tilde{y}_{k,q-1}]$ where $[\tilde{y}_{k,0}, \tilde{y}_{k,1}, \ldots, \tilde{y}_{k,q-1}]$ is as follows:

$$\begin{bmatrix} \tilde{y}_{k,0} \\ \tilde{y}_{k,1} \\ \vdots \\ \tilde{y}_{k,q-1} \end{bmatrix} =$$

$$\begin{bmatrix} g_{k,0} & g_{k,1} & \cdots & g_{k,q+1} & 0 & \cdots & 0 \\ 0 & g_{k,0} & g_{k,1} & \ddots & g_{k,q+1} & \cdots & 0 \\ \vdots & \ddots & \ddots & \ddots & \ddots & \ddots & \vdots \\ 0 & \cdots & 0 & g_{k,0} & g_{k,1} & \cdots & g_{k,q+1} \end{bmatrix} \begin{bmatrix} y_{\lfloor \frac{b}{a} k \rfloor} \\ y_{\lfloor \frac{b}{a} k \rfloor - 1} \\ \vdots \\ y_{\lfloor \frac{b}{a} k \rfloor - p - q + 2} \end{bmatrix}$$

Here, at each adaptation step, one sample of the error $e_k$ is combined with a filtered version ($\tilde{y}_k$) of filter input $y_k$, similar to method described in reference to FIG. 2. This represents the method and structure of a receiver with an asynchronous time varying internal filter implementing SGD in a forward formulation or SGD in the error domain. Of course, there can be other variations, modifications, and alternatives.

Figure 7:
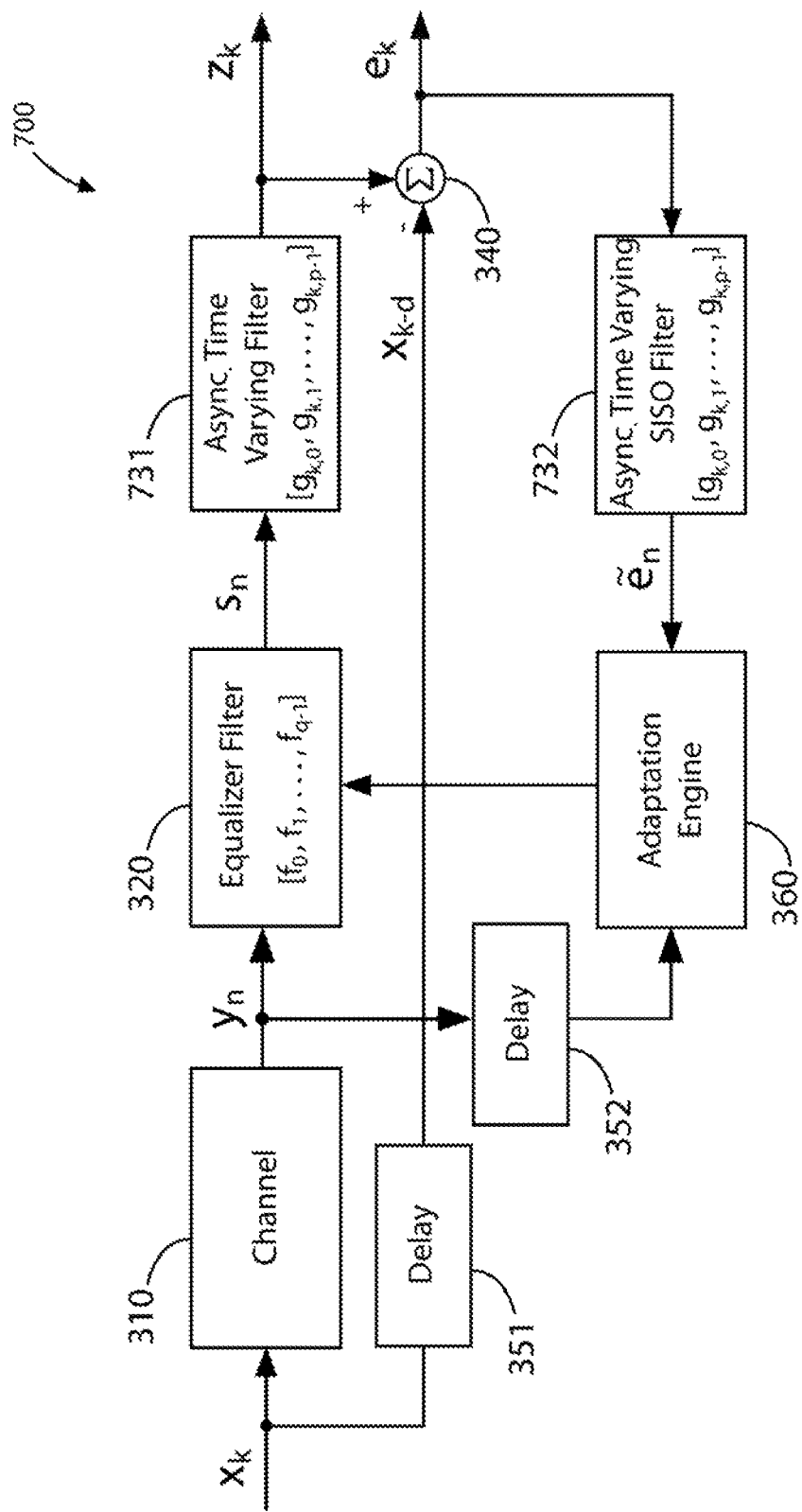
FIG. 7 is a simplified diagram illustrating a coherent optical receiver, with asynchronous time varying filters, implementing a backward propagation algorithm according to an example of the present invention.

In an example, the present invention provides for a method of stochastic gradient descent (SGD) in a backward formulation (BF) using an asynchronous time varying internal filter. FIG. 7 is a simplified diagram illustrating a coherent optical receiver implementing a backward propagation algorithm according to an example of the present invention. As shown, receiver 700 is structurally similar to receiver 300, except that the first filter module 731 is an asynchronous time varying filter and the second filter module 732 is an asynchronous time varying SISO filter. Here, the first filter function coefficients and the second filter function coefficients are represented by $[g_{k,0}, g_{k,1}, \ldots, g_{k,p-1}]$. The derivation with regard to the backward formulation stochastic gradient for an asynchronous time varying filter is discussed below.

From the previous example, the stochastic (instantaneous) gradient is as follows:

$$\nabla e_k^2 = 2e_k[\tilde{y}_{k,0}, \tilde{y}_{k,1}, \ldots, \tilde{y}_{k,q-1}]$$

where $$\tilde{y}_{k,i} = \sum_{j=0}^{p-1} g_{k,j} y_{\lfloor \frac{b}{a}k \rfloor - i - j}.$$

Further derivations result as follows:

$$\nabla e_k^2 = 2e_k \left[ \sum_{j=0}^{p-1} g_{k,j} y_{\lfloor \frac{b}{a}k \rfloor - j}, \sum_{j=0}^{p-1} g_{k,j} y_{\lfloor \frac{b}{a}k \rfloor - j - 1}, \ldots, \sum_{j=0}^{p-1} g_{k,j} y_{\lfloor \frac{b}{a}k \rfloor - j - q + 1} \right] =$$

$$2e_k \sum_{j=0}^{p-1} g_{k,j} \left[ y_{\lfloor \frac{b}{a}k \rfloor - j}, y_{\lfloor \frac{b}{a}k \rfloor - j - 1}, \ldots, y_{\lfloor \frac{b}{a}k \rfloor - j - q + 1} \right]$$

Therefore, the average gradient is as follows:

$$\nabla \sum_k e_k^2 = 2 \sum_k e_k \sum_{j=0}^{p-1} g_{k,j} \left[ y_{\lfloor \frac{b}{a}k \rfloor - j}, y_{\lfloor \frac{b}{a}k \rfloor - j - 1}, \ldots, y_{\lfloor \frac{b}{a}k \rfloor - j - q + 1} \right]$$

where $e_k^2$ is summed over all available values of k (ideally $k \in (-\infty, \infty)$).

Restructuring the gradient equation and introducing variable $$n = \left\lfloor \frac{b}{a} k \right\rfloor - j$$

results as follows:

$$\nabla \sum_k e_k^2 = 2 \sum_n \sum_{j=0}^{p-1} g_{\lfloor \frac{a}{b}(n+j) \rfloor, j} e_{\lfloor \frac{a}{b}(n+j) \rfloor} [y_n, y_{n-1}, \ldots, y_{n-q+1}] =$$

$$2 \sum_n \tilde{e}_n [y_n, y_{n-1}, \ldots, y_{n-q+1}]$$

where $\tilde{e}_n = \sum_{j=0}^{p-1} g_{\lfloor \frac{a}{b}(n+j) \rfloor, j} e_{\lfloor \frac{a}{b}(n+j) \rfloor}$.

Therefore, a new stochastic gradient based on $\tilde{e}_n$ is as follows:

$$\nabla e_k^2 = 2\tilde{e}_n [y_n, y_{n-1}, \ldots, y_{n-q+1}]$$

where $\tilde{e}_n$ is $e_k$ back-propagated to the asynchronous domain.

Thus, the backward propagation of the error can be represented as follows:

$$\tilde{e}_n = \sum_{j=0}^{p-1} g_{\lfloor \frac{a}{b}(n+j) \rfloor, j} e_{\lfloor \frac{a}{b}(n+j) \rfloor}$$

Further, the zero order backward propagation of the error is as follows:

$$\tilde{e}_n = e_{\lfloor \frac{a}{b}(n+\frac{p-1}{2}) \rfloor}$$

Here, at each adaptation step, the filter input samples $y_k$ are combined with a filtered version ($\tilde{e}_k$) of error $e_k$. This represents the method and structure of a receiver with an asynchronous time varying internal filter implementing SGD in a backward formulation or SGD in the signal domain. Of course, there can be other variations, modifications, and alternatives.

In an example, the present invention provides a method for operating a coherent optical receiver device using forward propagation. The method can include providing an input signal; receiving, by a channel module, the input signal; and filtering, by an equalizer filter module coupled to the channel module, the input signal to equalize a gain response of the input signal over a wavelength range. The method can also include filtering, by a first filter module coupled to the equalizer filter module, the input signal according to a first filter function; and filtering, by a second filter module coupled to channel module, the input signal according to a second filter function. The method can further include delaying, by a delay module is coupled to a combining module that is coupled to the first filter module, the input signal; and obtaining, by the combining module, an error signal by combining the delayed input signal and the first filter module output. As described in FIGS. 2, 4, and 6, the method can include computing; by an adaptation engine module coupled to the second filter module, and coupled in a loop to the equalizer filter module, and the combining module; a forward formulation stochastic gradient from the second filter module output and the error signal.

In an example, the present invention provides a method for operating a coherent optical receiver device using backward propagation. The method can include providing an input signal; receiving, by a channel module, the input signal; and filtering, by an equalizer filter module coupled to the channel module, the input signal to equalize a gain response of the input signal over a wavelength range. The method can also include filtering, by a first filter module coupled to the equalizer filter, the input signal according to a first filter function; delaying, by a first delay module coupled to a combining module that is coupled to the first filter module, the input signal; and obtaining, by the combining module, an error signal by combining outputs of the first delay module and the first filter module. The method can further include filtering, by a second filter module coupled to the combining module, the error signal according to a second filter function; and delaying, by a second delay module coupled to the channel module, the channel module output. As described in FIGS. 3, 5, and 7, the method can include computing; by an adaptation engine module coupled to the second delay module, the second filter module, and the equalizer filter module; a backward formulation stochastic gradient from the second filter module output and the delayed channel output.

In an example, regularization can be used to address possible adaptation problems. In the case that the asynchronous time varying filter g has nulls in the frequency domain, the adaptation (in forward and backward formulations) is open to those frequencies and the coefficient f can diverge without degrading the error energy. Particularly, tap leakage may be implemented to avoid the problem. Alternatively, if the frequency nulls are known, the coefficient off can be forced to have the same nulls.

Many benefits can be achieved through various examples of the present invention. Asynchronous equalization helps to reduce complexity and power dissipation, and also improves the robustness of timing recovery. The present invention provides for both forward propagation and backward propagation. In the forward case, the filter input signal is forward propagated through a filter to the adaptation engine, while, in the backward case, the error signal is backward propagated through a filter to the asynchronous domain. Using such forward and backward propagation schemes reduces implementation complexity while providing optical device performance.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A coherent optical receiver device, the device comprising:
an equalizer filter module configured to equalize a gain response of an input signal over a wavelength range;
a first filter module coupled to the equalizer filter module, the first filter module being configured to filter the input signal according to a first filter function;
a second filter module configured to filter the input signal according to a second filter function;
a combining module coupled to the first filter module;
wherein the combining module is configured to obtain an error signal by combining the input signal and the first filter module output;
an adaptation engine module coupled to the second filter module, the equalizer filter module, and the combining module;
wherein the adaptation engine module is configured to compute a forward formulation stochastic gradient from the second filter module output and the error signal.

2. The device of claim 1 wherein the first filter module and the second filter module are static filter modules; and wherein the adaptation engine module is configured to compute the forward formulation stochastic gradient according to the following equation:

$$\nabla e_k^2 = 2e_k \sum_{j=0}^{p-1} g_j y_{k-i-j}$$

where $e_k$ is the error signal,
where $g_j$ refers the filter coefficients, and
where $y_k$ is a channel output.

3. The device of claim 1 wherein the first filter module is a time varying filter and the second filter module is a time varying single-input multiple-output (SIMO) filter; and wherein the adaptation engine module is configured to compute the forward formulation stochastic gradient according to the following equation:

$$\nabla e_k^2 = 2e_k \sum_{j=0}^{p-1} g_{k,j} y_{k-i-j}$$

where $e_k$ is the error signal,
where $g_{k,j}$ refers the filter coefficients of the second filter module, and
where $y_k$ is a channel output.

4. The device of claim 1 wherein the first filter module is an asynchronous time varying filter and the second filter module is an asynchronous time varying single-input multiple-output (SIMO) filter; and wherein the adaptation engine module is configured to compute the forward formulation stochastic gradient according to the following equation:

$$\nabla e_k^2 = 2e_k \sum_{j=0}^{p-1} g_{k,j} y_{\lfloor \frac{b}{a} k \rfloor - i - j}$$

where k is the discrete time index of the input signal,
where n is the discrete time index of a channel output,
where $$k = \left\lfloor \frac{a}{b} n \right\rfloor,$$

where a and b are integers such that a≤b,
where $e_k$ is the error signal,
where $g_{k,j}$ refers to the filter coefficients of the second filter module, and
where $y_k$ is a channel output.

5. The device of claim 1 wherein the adaptation engine module is configured to compute the forward formulation stochastic gradient with a tap-leakage factor.

6. The device of claim 1 wherein at least one of the equalizer filter module, the first filter module, and the second filter module includes a non-linear filter.

7. The device of claim 1 wherein at least one of the equalizer filter module, the first filter module, and the second filter module includes a plurality of filters in at least one of a serial configuration and a parallel configuration.

8. A method for operating a coherent optical receiver device, the method comprising:
filtering, by an equalizer filter module, an input signal to equalize a gain response of the input signal over a wavelength range;

filtering, by a first filter module coupled to the equalizer filter module, the input signal according to a first filter function;

filtering, by a second filter module, the input signal according to a second filter function;

obtaining, by the combining module, an error signal by combining the input signal and the first filter module output;

computing; by an adaptation engine module coupled to the second filter module, the equalizer filter module, and the combining module; a forward formulation stochastic gradient from the second filter module output and the error signal.

9. The method of claim 8 wherein the first filter module and the second filter module are static filter modules; and wherein computing the forward formulation stochastic gradient is according to the following equation:

$$\nabla e_k^2 = 2e_k \sum_{j=0}^{p-1} g_j y_{k-i-j}$$

where $e_k$ is the error signal, where $g_j$ refers the filter coefficients, and where $y_k$ is a channel output.

10. The method of claim 8 wherein the first filter module is a time varying filter and the second filter module is a time varying single-input multiple-output (SIMO) filter; and wherein computing the forward formulation stochastic gradient is according to the following equation:

$$\nabla e_k^2 = 2e_k \sum_{j=0}^{p-1} g_{k,j} y_{k-i-j}$$

where $e_k$ is the error signal, where $g_{k,j}$ refers the filter coefficients of the second filter module, and where $y_k$ is a channel output.

11. The method of claim 8 wherein the first filter module is an asynchronous time varying filter and the second filter module is an asynchronous time varying single-input multiple-output (SIMO) filter; and wherein computing the forward formulation stochastic gradient is according to the following equation:

$$\nabla e_k^2 = 2e_k \sum_{j=0}^{p-1} g_{k,j} y_{\lfloor \frac{b}{a} k \rfloor - i - j}$$

where k is the discrete time index of the input signal, where n is the discrete time index of a channel output, where $$k = \left\lfloor \frac{a}{b} n \right\rfloor,$$

where a and b are integers such that a≤b, where $e_k$ is the error signal, where $g_{k,j}$ refers to the filter coefficients of the second filter module, and where $y_k$ is a channel output.

12. The method of claim 8 wherein computing the forward formulation stochastic gradient includes computing with a tap-leakage factor.

13. The device of claim 8 wherein at least one of the equalizer filter module, the first filter module, and the second filter includes a non-linear filter module.

14. The device of claim 8 wherein at least one of the equalizer filter module, the first filter module, and the second filter module includes a plurality of filters in at least one of a serial configuration and a parallel configuration.

15. A coherent optical receiver device, the device comprising:

an equalizer filter module configured to equalize a gain response of an input signal over a wavelength range;

a first filter module coupled to the equalizer filter, the first filter being configured to filter the input signal according to a first filter function;

a combining module coupled to the first filter module;

wherein the combining module is configured to obtain an error signal by combining the input signal and the output of the first filter module;

a second filter module coupled to the combining module, the second filter module being configured to filter the error signal according to a second filter function; and an adaptation engine module receiving the input signal and coupled to the second filter module and the equalizer filter module;

wherein the adaptation engine module is configured to compute a backward formulation stochastic gradient from the second filter module output and a channel output.

16. The device of claim 15 wherein the first filter module and the second filter module are static filter modules; and wherein the adaptation engine module is configured to compute the backward formulation stochastic gradient according to the following equation:

$$\tilde{e}_n = \sum_{j=0}^{p-1} g_j e_{n+j}$$

where n=k−j, where $e_k$ is the error signal, where $g_j$ is the filter coefficients, and where $\tilde{e}_n$ is $e_n$ filtered by coefficients $g_j$ in reverse order.

17. The device of claim 15 wherein the first filter module is a time varying filter and the second filter module is a time varying single-input single-output (SISO) filter; and wherein the adaptation engine module is configured to compute the backward formulation stochastic gradient according to the following equation:

$$\tilde{e}_n = \sum_{j=0}^{p-1} g_{n+j,j} e_{n+j}$$

where n=k−j, where $e_n$ is the error signal, where $g_{n+j,j}$ is the filter coefficients, and where $\tilde{e}_n$ is $e_k$ back-propagated to the equalizer filter module output.

18. The device of claim 15 wherein the first filter module is an asynchronous time varying filter and the second filter module is an asynchronous time varying single-input single-output (SISO) filter; and wherein the adaptation engine module is configured to compute the backward formulation stochastic gradient according to the following equation:

$$\tilde{e}_n = \sum_{j=0}^{p-1} g_{\lfloor \frac{a}{b}(n+j) \rfloor, j} e_{\lfloor \frac{a}{b}(n+j) \rfloor}$$

where k is the discrete time index of the input signal,
where n is the discrete time index of the channel output,
where $$n = \left\lfloor \frac{b}{a} k \right\rfloor - j,$$

where a and h are integers such that a≤b,
where $e_k$ is the error signal,
where $g_{k,j}$ refers to the filter coefficients of the second filter module, and
where $y_k$ is the channel output.

19. The device of claim 15 wherein the adaptation engine module is configured to compute the backward formulation stochastic gradient with a tap-leakage factor.

20. The device of claim 15 wherein at least one of the equalizer filter module, the first filter module, and the second filter includes a non-linear filter module.

21. The device of claim 15 wherein at least one of the equalizer filter module, the first filter module, and the second filter module includes a plurality of filters in at least one of a serial configuration and a parallel configuration.

22. A method of operating a coherent optical receiver device, the method comprising:
filtering, by an equalizer filter module, an input signal to equalize a gain response of the input signal over a wavelength range;
filtering, by a first filter module coupled to the equalizer filter, the input signal according to a first filter function;
obtaining, by the combining module, an error signal by combining the input signal and the output of the first filter module;
filtering, by a second filter module coupled to the combining module, the error signal according to a second filter function; and
computing, by an adaptation engine module coupled to the second filter module and the equalizer filter module, a backward formulation stochastic gradient from the second filter module output and a channel output.

23. The method of claim 22 wherein the first filter module and the second filter module are static filter modules; and wherein computing the backward formulation stochastic gradient is according to the following equation:

$$\tilde{e}_n = \sum_{j=0}^{p-1} g_j e_{n+j}$$

where n=k−j,
where $e_k$ is the error signal,
where $g_j$ is the filter coefficients, and
where $\tilde{e}_n$ is $e_n$ filtered by coefficients $g_j$ in reverse order.

24. The method of claim 22 wherein the first filter module is a time varying filter and the second filter module is a time varying single-input single-output (SISO) filter; and wherein computing the backward formulation stochastic gradient is according to the following equation:

$$\tilde{e}_n = \sum_{j=0}^{p-1} g_{n+j,j} e_{n+j}$$

where n=k−j,
where $e_n$ is the error signal,
where $g_{n+j,j}$ is the filter coefficients, and
where $\tilde{e}_n$ is $e_k$ back-propagated to the equalizer filter module output.

25. The method of claim 22 wherein the first filter module is an asynchronous time varying filter and the second filter module is an asynchronous time varying single-input single-output (SISO) filter; and wherein computing the backward formulation stochastic gradient is according to the following equation:

$$\tilde{e}_n = \sum_{j=0}^{p-1} g_{\lfloor \frac{a}{b}(n+j) \rfloor, j} e_{\lfloor \frac{a}{b}(n+j) \rfloor}$$

where k is the discrete time index of the input signal,
where n is the discrete time index of the channel output,
where $$n = \left\lfloor \frac{b}{a} k \right\rfloor - j,$$

where a and b are integers such that a≤b,
where $e_k$ is the error signal,
where $g_{k,j}$ refers to the filter coefficients of the second filter module, and
where $y_k$ is the channel output.

26. The method of claim 22 wherein computing the backward formulation stochastic gradient includes computing with a tap-leakage factor.

27. The device of claim 22 wherein at least one of the equalizer filter module, the first filter module, and the second filter includes a non-linear filter module.

28. The device of claim 22 wherein at least one of the equalizer filter module, the first filter module, and the second filter module includes a plurality of filters in at least one of a serial configuration and a parallel configuration.

* * * * *